Nov. 27, 1923.	G. BLAUFUSS	1,475,534
WATER FILTER
Filed June 10, 1920	4 Sheets-Sheet 1
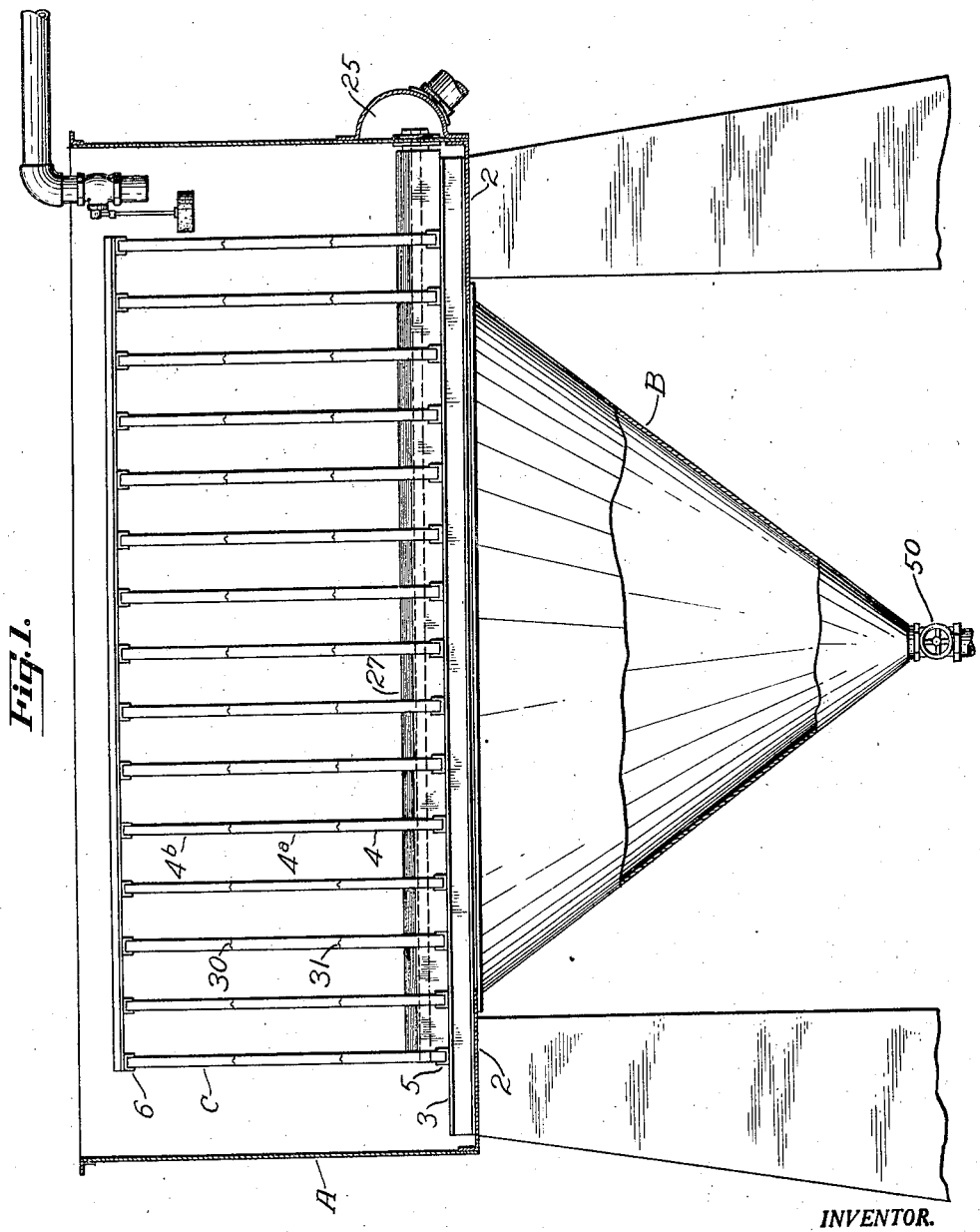
INVENTOR.
GEORGE BLAUFUSS.
BY Chas. E. Townsend
ATTORNEY

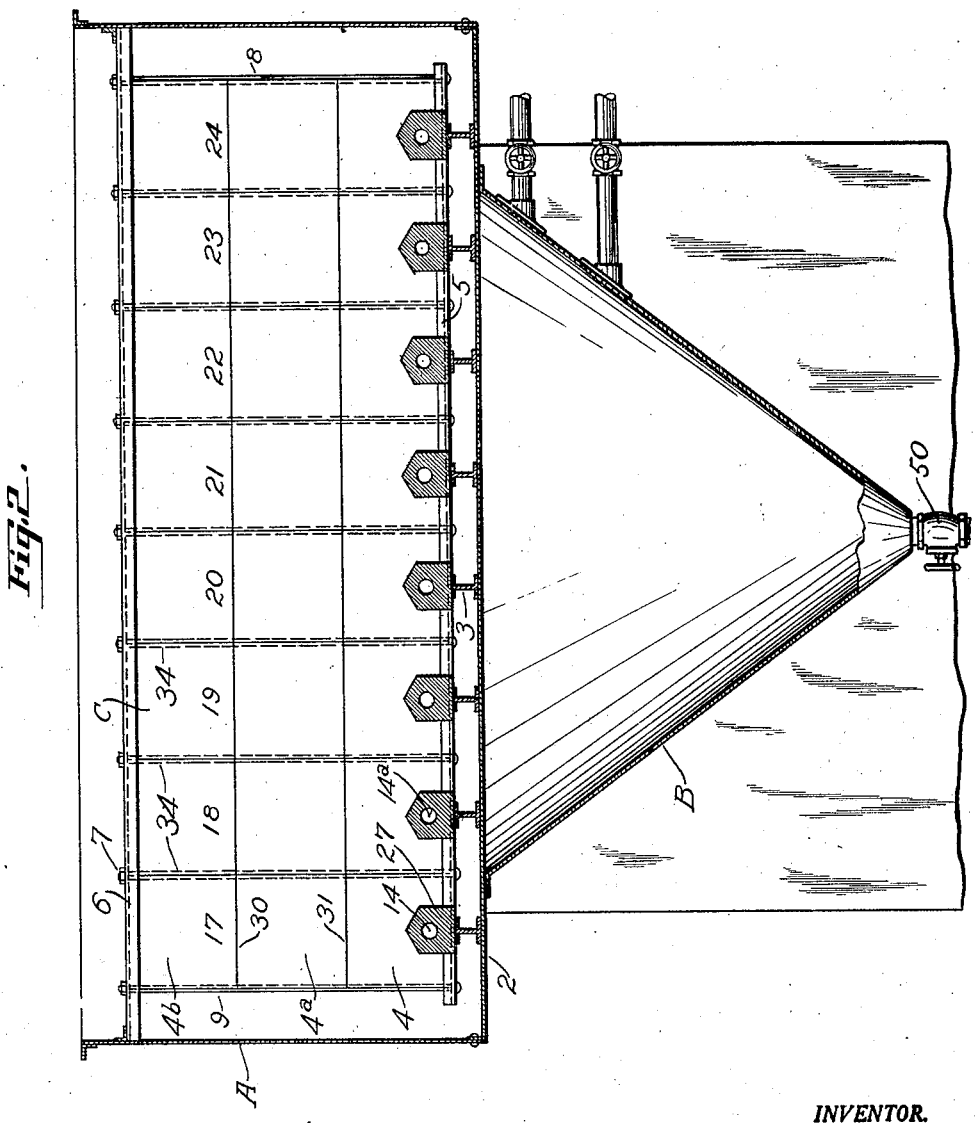

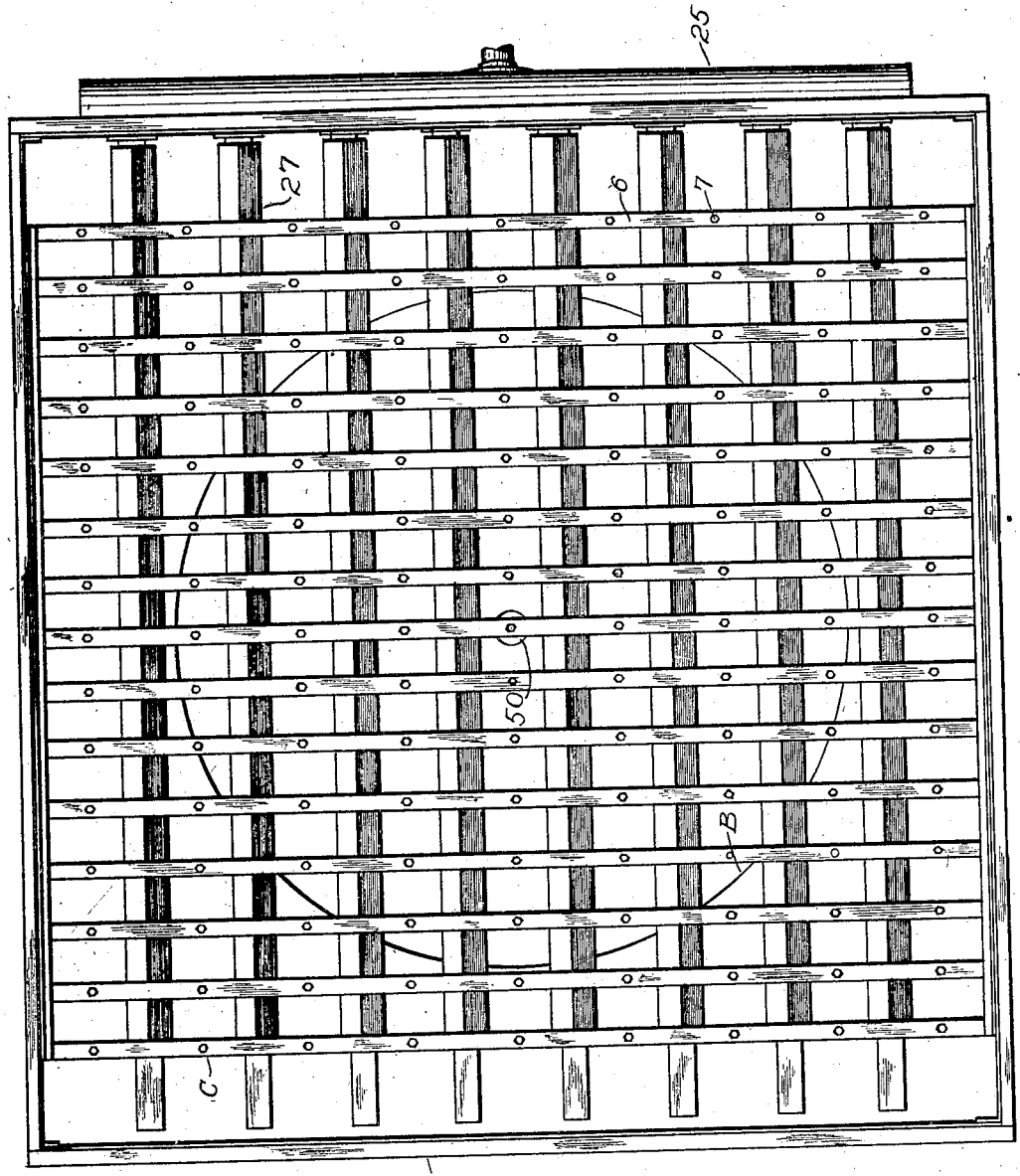

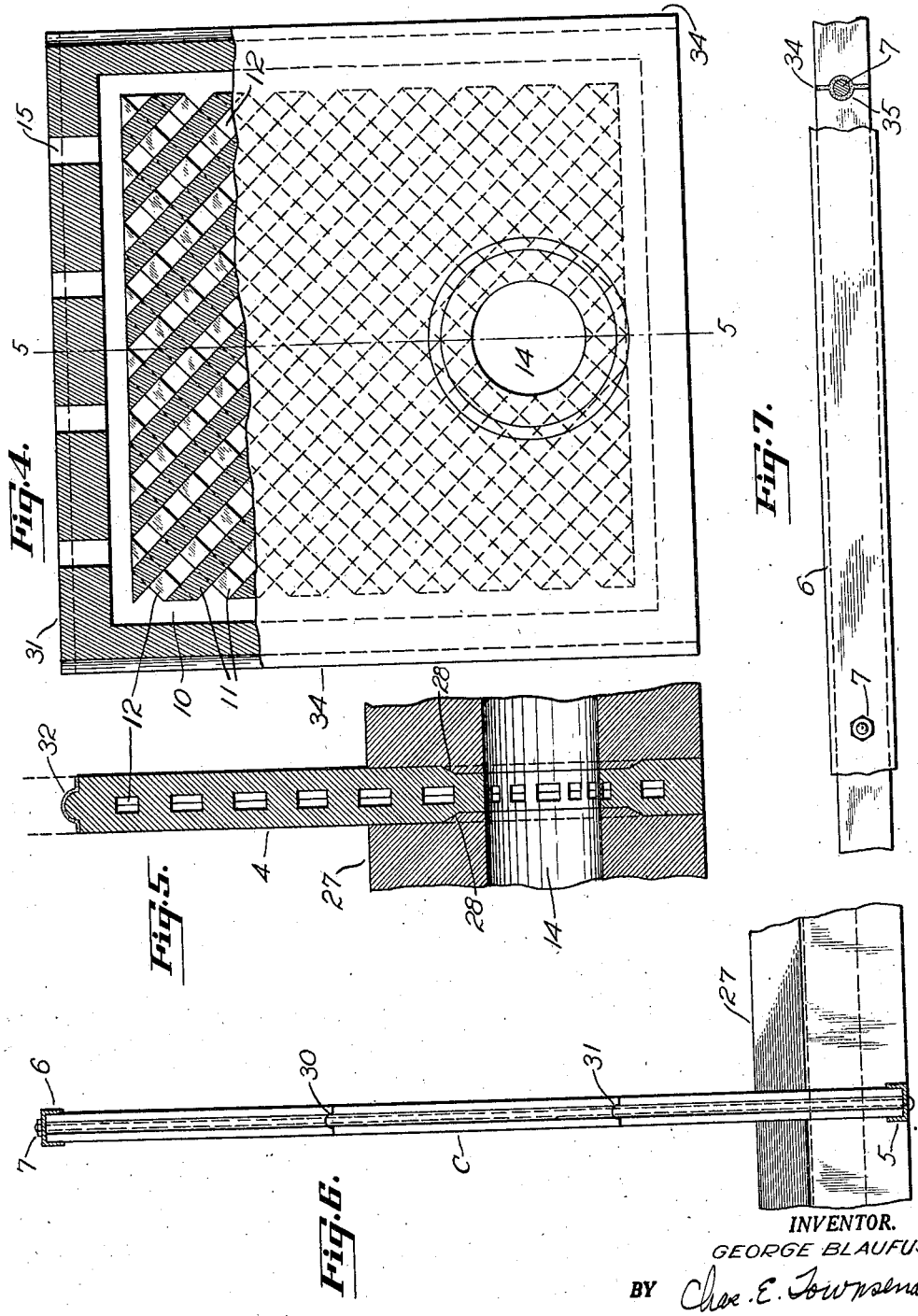

Patented Nov. 27, 1923.

1,475,534

UNITED STATES PATENT OFFICE.

GEORGE BLAUFUSS, OF NAPA, CALIFORNIA.

WATER FILTER.

Application filed June 10, 1920. Serial No. 387,885.

*To all whom it may concern:*

Be it known that I, GEORGE BLAUFUSS, a citizen of the United States, residing at Napa, in the county of Napa and State of California, have invented a new and useful Improvement in Water Filters, of which the following is a specification.

This invention relates to a filter and especially to water filters of large capacity, such as employed in city or municipal water works and the like.

One of the objects of the present invention is to provide a water filter of large capacity in which removal of sand, mud and other impurities is accomplished by the combined action of settling and filtration, and in such a manner that the settled sands and mud, together with impurities adhering to the filtering medium may be readily dislodged and removed when cleaning the filter.

Another object of the invention is to provide a series of filtering units, all adapted to be arranged in a single tank or container and so connected that the flow of all may be combined and directed to a common discharge.

Another object of the invention is to provide a novel mounting and support for the individual filtering units to permit ready installation, removal or replacement of the same; further to provide filtering units, each of which are built up of a plurality of porous filtering plates so assembled and connected that leakage is prevented and large opposed filtering surfaces presented.

Further objects will hereinafter appear.

The invention consists of the parts and the construction, combination and arrangement of parts as hereinafter more fully described and claimed, having reference to the accompanying drawings, in which—

Fig. 1 is a side elevation of the filter partly in section.

Fig. 2 is a central cross section of the filter.

Fig. 3 is a plan view of the filter.

Fig. 4 is a detail view partly in section showing one of the filtering plates.

Fig. 5 is a cross section of a filtering plate taken on line 5—5, Fig. 4.

Fig. 6 is a detail end view of one of the filtering units.

Fig. 7 is a detail plan view of one of the filtering units partly broken away.

Referring to the drawings in detail, A indicates an open rectangular-shaped tank of suitable size and depth, the lower portion of which terminates in a cone-shaped bottom section B. Extending lengthwise of the tank and supported by a portion of the bottom section 2, is a plurality of I-beams 3; and supported by said I-beams is a plurality of filtering units as indicated at C. Each filtering unit is identical and is constructed as follows:

Referring to Fig. 2, 4 indicates a plurality of porous filtering plates. Each unit is in this instance constructed of twenty-four filtering plates assembled as shown in Fig. 2, the plates being eight rows wide and three tiers high. The filtering plates are supported by a lower channel bar 5 and are clamped together by means of said channel bar and an upper channel bar 6, the clamping action being produced by providing a plurality of tie rods as indicated at 7. These tie rods connect the upper and lower channel beams respectively, one rod being disposed at each end of the plates as at 8 and 9, and other rods extending downwardly between the plates as at 7. The construction of the individual filtering plates is more clearly shown in Figs. 4 and 5. They are approximately square in shape and comparatively thin when viewed from the top or side. Formed within each plate is a central chamber 10, and formed on the inner opposed walls of said chamber are inclined ribs 11, the ribs on one wall are arranged at an angle of 45° to the perpendicular (see Fig. 4), and the ribs on the other wall arranged at the opposite angle as indicated by dotted lines in the same view. Water penetrating the porous surfaces presented drains downwardly between channels 12, formed between the ribs 11, and discharges through an opening 14 formed in the lowermost plate. Fig. 4 is a detail view of the lowermost plate employed, and the superposed plates indicated at $4^a$ and $4^b$ are practically identical thereto with the exception that the discharge opening 14 is omitted, but connecting drain openings 15 are formed in the upper and lower edges, that is communicating drain openings 15 are formed both in the upper and lower edges of the central filtering plate 4ª, and similarly communicating drain openings in the lower edge of the uppermost plate 4ᵇ. Water penetrating the porous surfaces presented by the plates 4ᵇ drains through openings such as indicated at 15 in Fig. 4, into the central chamber of the plate 4ª. It then runs down through said chamber between the ribs 11 and discharges through the lower drain openings 15 into the central chamber of the lowermost plate 4 where it finally discharges through the opening 14. The filtering plates indicated in a unit C, such as shown in Fig. 2, is in reality arranged in secondary units, that is eight rows of stacked plates are provided as indicated at 17, 18, 19, 20, 21, 22, 23 and 24. The plates 4, 4ª and 4ᵇ in the secondary unit 17 cooperate, and similarly the plates in the secondary units 18, 19, 20, 21, 22, 23 and 24. All water entering the plates 4, 4ª and 4ᵇ of the secondary unit discharges through the common discharge 14 and is finally delivered to a discharge manifold connection 25, (see Fig. 1). In this figure it can be seen that fifteen main units, such as indicated at C, are provided. These are arranged crosswise of the tank and are supported by the lower I-beams 3. The combined flow of the secondary units 17 of all the main units C discharges through a common connection and empties into the manifold 25. The combined flow of all the secondary units 18, formed in the respective main units C, also discharges through a common discharge 14ª and empties into the manifold, and similarly the remaining secondary units.

The discharge connections at 14 consist of pipes 27, (see Figs. 3 and 5) which are interposed between the filtering units C, the length of each pipe being equal to the spacing between the filtering units C. To form a tight joint between the pipe sections 27 and the respective filtering plates or the openings 14 formed therein, I form a recess, such as shown at 28, in the opposite faces of the lowermost filtering plates, and similarly shoulders on the ends of the pipe sections 27, which are adapted to enter the recesses 28. Ground joints may be formed between the pipes 27 and the recesses 28, or a suitable cement or packing material may be interposed if desired.

The only place where a water-proof joint is formed between the filtering plates 4, 4ª and 4ᵇ of a secondary unit is along the contacting ends indicated at 30 and 31. (See Figs. 2 and 4.) I therefore form a tongue and groove joint along these edges as at 32 (see Fig. 5) and place cement or other packing material between the same to form water-proof joints except as to the drain passages or connections 15. This construction provides water proof joints around the said drain passages or connections 15 so that there will be no lateral leakage of the water passing through the said drain passages or connections 15. A water-proof connection or joint between the secondary units 17, 18 and 19 is not required along the contacting edges 34 (see Fig. 2) as water flow or drainage between the plates only takes place in a vertical direction as through the drain openings 15. (See Fig. 4.) The tie rods 7 pass vertically between the filtering plates where the secondary units engage each other, and I therefore form a groove in the opposite faces 34 as at 35. This forms a central channel through which the tie rods 7 may be inserted, and as no water-proof joint is formed along these edges, it is obvious that the amount of packing or cement employed may be reduced to a minimum.

In actual operation I assemble each unit C separately by placing the filtering plates 4, 4ª and 4ᵇ on top of each other and insert a packing or cement between the contacting or adjoining edges 30 and 31. A secondary unit is in this manner assembled and the next units 17, 18, 19, 20, 21, 22, 23 and 24, are then placed in position in a similar manner. The top channel bar 6 is then placed in position and the tie rods 7, 8 and 9 inserted and drawn up tightly. A filtering unit is in this manner assembled and completed and may be lowered into the tank A where it is supported by the I-beams 3. A second unit such as C, when assembled, is next placed in position and these units are then connected by the drain pipe sections 27, a tight joint being formed between said drain pipe sections 27 by the structure and method described in conjunction with the Figs. 4 and 5. With the units all inserted and assembled, it can readily be seen that an enormous filtering surface is provided as each main unit C consists of eight secondary units, which in turn consists of three superposed plates, each having opposed or double filtering faces. In other words, if each plate in the secondary unit represented four square feet in area, then eight square feet of filtering surface would be provided by each filtering plate as both surfaces are porous and water penetrates the same. In other words eight square feet of filtering surface is presented by each plate and as there are three plates in a secondary unit and eight secondary units in a main unit, we will have an area on one side of a main unit equalling ninety-six square feet, and when both sides are taken into consideration, one hundred and ninety-two square feet are presented. Each main unit, if the plates therein measure four square feet, presents one hundred and ninety-two square feet, and as the present drawing shows fifteen main units, we have 15 times 192, or two thousand eight hundred and eighty square feet. I, of coursee, do not wish to limit my invention to any specific number of main units, nor to any specific number of plates in a secondary unit, nor to any specific number of secondary units in a main unit. The foregoing figures are merely given to demonstrate the large area provided under certain conditions.

The main filtering units may be closely spaced as shown in Fig. 3, and as each is independently supported, it can be seen that the porous plates are subjected to a comparatively light load and strain. The filter may be employed as a pressure filter by closing the same and delivering water under pressure to the tank A, or it may be employed as a suction filter by connecting the manifold 25 with a suction pump or the like. This method of operating a filter has been found economical and practical as it permits a cheaper tank structure, and also permits greater accessibility for inspection and repairs.

In actual operation it can be seen that removal of impurities, such as sand, mud, vegetable matter, etc., is accomplished by two actions, first by a settling, and secondly by filtration, that is any impurities sufficiently heavy to settle will tend to drop into the cone-shaped bottom section B, while lighter materials will tend to flow with the water as this penetrates the filtering plates. Finer substances are thus caught on the exterior faces of the filtering units or plates, while the heavier materials settle to the bottom. Both may be readily removed when cleaning the filter by opening a drain valve 50 in the bottom of the tank and by subjecting the faces of the filtering units to a stream of water supplied under pressure, for instance by a hose or the like. Again, dislodging of impurities coating the filtering faces may be accomplished by reversing the flow of water through the manifold 25 and exerting sufficient pressure to permit the water to penetrate the filtering plates in a reverse direction. In actual operation I prefer to protect the filtering faces by coating the same, to a certain extent, with a thin layer of infusorial earth. This is accomplished by adding a certain amount of infusorial earth to the water delivered to the tank. The infusorial earth thus delivered rapidly coats the plates and forms a protecting layer, which in itself becomes a filtering medium, and which will keep the filter bed loose and prevent it from being clogged up by slimy matter. This layer is of course removed when the filter is cleaned, but may be readily replaced when the filter is again placed in operation by adding a certain amount of the same to the incoming water until the plates have become sufficiently coated.

By employing a filter, such as here shown, I eliminate the necessity of employing coagulates, as sulphide of aluminum or the like, as impurities sufficiently heavy are removed by settling action, and materials maintained in suspension are removed by filtration through a porous surface. The idea of covering the filtering plates with infusorial earth does not form any part of the present invention, but is merely described as it materially increases the efficiency and practical handling of a filter of this character.

The real feature of the present invention is the construction of the individual filtering unit C, that is the method of assembling the plates contained therein, also in the method of assembling and supporting the several filtering units, and further, in providing a cone-shaped bottom for the reception of settling solids.

While certain features of the present invention are more or less specifically illustrated, I wish it understood that various changes in form and proportion may be resorted to within the scope of the appended claims, similarly that the materials and finish of the several parts employed may be such as the experience and judgement of the manufacturer may dictate or varying conditions may demand.

Having thus described my invention, what I claim and desire to secure by Letters Patent is—

1. In a filter of the character described a filtering unit comprising a plurality of porous filtering plates, said plates being arranged in a plurality of contiguous rows placed side by side, and each row consisting of a plurality of superposed vertical plates arranged on edge one upon another, said superposed plates being connected so that the flow of all the plates in one row may be combined, a plurality of discharge connections, one for each row of plates and means common to the contiguous rows of plates for clamping the same together to form a single unit.

2. In a filter of the character described, a filtering unit comprising a plurality of porous filtering plates, said plates being arranged in a plurality of rows placed side by side and each row consisting of a plurality of superposed vertical plates arranged on edge one upon another, said superposed plates being connected so that the flow of all the plates in one row may be combined, and means common to the said rows for clamping the same together to form a single unit.

3. In a filter of the character described a filtering unit comprising a plurality of porous filtering plates, said plates being arranged in a plurality of rows placed side by side, and each row consisting of a plurality of superposed vertical plates arranged on edge one upon another, said superposed plates being connected so that the flow of all the plates in one row may be combined, a plurality of discharge connections, one for each row of plates, said discharge connections communicating with the lowermost plates and means common to the rows for clamping the same together to form a single unit.

4. In a filter of the character described a filtering unit consisting of a plurality of porous filtering plates, said plates being arranged in units placed side by side, and each unit consisting of two or more superposed plates, a drain connection for each unit of superposed plates, a base member supporting the several units of superposed plates, a cap plate engaging the uppermost filtering plates, and screw rods connecting the base and cap plate to secure the filtering plates as a unit.

5. In a filter of the character described a filtering unit consisting of a plurality of porous filtering plates, said plates being arranged in units placed side by side, and each unit consisting of two or more superposed plates, a drain connection for each unit of superposed plates, a base member supporting the several units of superposed plates, a cap plate engaging the uppermost filtering plates, and a plurality of screw rods connecting the base and cap plate, said screw rods passing downwardly between each vertical unit of filtering plates and drain connections between the superposed filtering plates in each unit.

6. In a filter of the character described, a filtering unit consisting of a pair of channel bars, a plurality of porous filtering plates secured between the same, said plates being arranged in units placed side by side and each unit consisting of two or more superposed plates, drain connections formed between the superposed plates and the unit, and a discharge connection in the lowermost filtering plate in each unit.

7. In a filter of the character described a plurality of main filtering units, each unit consisting of a plurality of assembled porous filtering plates, the plates in each main filtering unit being arranged vertically on edge one upon another in units placed side by side, and each unit consisting of two or more superposed plates, drain connections between the superposed plates in each unit, a discharge connection in the lowermost plate of each superposed unit, said drain connections connecting the several units of the main units, and a common discharge connection into which all of the last named connections empty.

8. In a filter of the character described, comprising a tank, a cone shaped bottom in said tank, bars extending from end to end of the tank above the cone shaped section, a plurality of porous filtering units composed of a plurality of superposed vertical porous plates arranged on edge one upon another, means common to the plates for clamping the same together to form the units, said clamping means being arranged at an angle to the said bars, a plurality of drain connections connecting the several filter units, and a common discharge with which all of the filter units communicate.

9. In a filter of the character described comprising a tank, a cone-shaped bottom section in the tank, bars extending longitudinally of the tank and above the cone-shaped section, a plurality of filtering units supported by said bars, each of said filtering units consisting of a plurality of assembled vertical porous filtering plates arranged on edge one upon another, a drain connection for each porous plate in the unit, said drain connections connecting the several porous plates in the several units, and a common discharge for all of the drain connections to combine the flow of all the filtering plates in the several units, said common discharge including separate pipe sections interposed between the units and communicating with the drain connections of the plates.

10. In a filter of the character described a main filtering unit, said unit consisting of a plurality of secondary units placed side by side, and each secondary unit consisting of a plurality of superposed porous plates, drain passages formed between the superposed plates in each secondary unit, and a discharge passage formed in the lowermost plate of each secondary unit.

11. In a filter of the character described a main filtering unit, said unit consisting of a plurality of secondary units placed side by side, and each secondary unit consisting of a plurality of superposed porous plates, drain passages formed between the superposed plates in each secondary unit, a discharge passage formed in the lowermost plate of each secondary unit, a water-proof joint formed between the contacting edges of the superposed plates in a secondary unit, a channel bar arranged along the lower edge of the secondary unit, a second channel bar extending along the upper edge of the secondary units, and tie rods separating the secondary units and connecting the channel bars.

12. In a filter of the character described, the filtering unit comprising a plurality of porous filtering plates, said plates being arranged in contiguous rows and each row being composed of a plurality of superposed vertical plates arranged on edge one upon another having interlocking joints at their contiguous horizontal edges, and the rows being provided at their contiguous vertical edges with grooves, and clamping means common to the plates of the said unit and comprising upper and lower bars arranged at the top and bottom of the filtering unit and connecting rods passing through the said grooves.

In testimony whereof I have hereunto set my hand in the presence of two subscribing witnesses.

GEORGE BLAUFUSS.

Witnesses:
W. W. HEALEY,
M. E. EWING.